United States Patent [19]

Kaplan

[11] Patent Number: 5,133,046

[45] Date of Patent: Jul. 21, 1992

[54] COMPUTER-BASED DIAGNOSTIC EXPERT SYSTEM ORGANIZED ACCORDING TO BAYESIAN THEORY

[75] Inventor: Stanley Kaplan, Rancho Palas Verdes

[73] Assignee: Pickard, Lowe and Carrick (PLC), Newport Beach, Calif.

[21] Appl. No.: 637,190

[22] Filed: Jan. 3, 1991

[51] Int. Cl.⁵ .................................. G06F 15/18
[52] U.S. Cl. ........................... 395/61; 395/912; 395/914
[58] Field of Search .............. 364/513, 550, 551.02; 395/54, 61, 912, 914

[56] References Cited

U.S. PATENT DOCUMENTS

| | | | |
|---|---|---|---|
| 4,648,044 | 3/1987 | Hardy et al. | 364/513 |
| 4,803,641 | 2/1989 | Hardy et al. | 364/513 |
| 4,818,620 | 4/1990 | Ulug | 364/513 |

Primary Examiner—Allen R. MacDonald
Attorney, Agent, or Firm—Herbert M. Shapiro

[57] ABSTRACT

An expert system is organized according to Bayes' theorem. The system includes a diagnostic module that generates a diagnosis in the form of probability distributions. The diagnostic module also is responsive to evidence in the form of discretized time trajectories in the value space of the observable variables. The diagnostic module is also responsive to data from a knowledge base that represents the trajectories of the possible states of the system and the associated values of the likelihood that the various trajectories of observed evidence would be present if the system were in that state.

10 Claims, 12 Drawing Sheets

ACCIDENT TRAJECTORY

ACCIDENT TRAJECTORY

DISCRETIZED TRAJECTORY

FAMILY OF TRAJECTORIES

STRUCTURE OF AN EXPERT SYSTEM

DISCRETIZATION APPARATUS

STORAGE APPARATUS FOR DISCRETE TRAJECTORIES

FIG. 7 FLOW DIAGRAM OF DIAGNOSTIC COMPUTATION PROCESS

PROTOTYPE KNOWLEDGE BASE

KNOWLEDGE BASE HIERARCHY

DIAGNOSIS FOR CASE 1

EVOLUTION OF DIAGNOSIS OVER TIME, CASE 2

DIAGNOSIS FOR CASE 3A

DIAGNOSIS FOR CASE 3B

DIAGNOSIS FOR CASE 3C

SCREEN

COMPUTER-BASED DIAGNOSTIC EXPERT SYSTEM ORGANIZED ACCORDING TO BAYESIAN THEORY

FIELD OF THE INVENTION

This invention relates to artificial intelligence (AI) and more particularly to a computer-based expert system that, in the event of a malfunction of a plant or a piece of equipment, provides the operator with a diagnosis of what is wrong as well as a list of recommended corrective actions. The diagnosis is in the form of a probability distribution over the set of possible causes of the malfunction. The diagnosis thus consists of identification of the possible causes and of the probability that each cause is the correct one. These probabilities are correctly calculated on the basis of evidence and symptoms input to the system.

BACKGROUND OF THE INVENTION

Expert systems for the control of plants and processing facilities are well known. Such systems include a "shell" that contains the general software architecture and structure that would apply, for example, to any nuclear plant.

Such a system also includes a plant-specific knowledge base. The knowledge base contains the information that describes the design and operation of a specific plant. The knowledge base is stored in memory accessed under the control of the shell to produce a plant-specific expert system. The traditional AI approach to structuring a diagnostic knowledge base is to encode the knowledge in a set of statements or "production rules" of the form: "If A, then B." This approach works in those cases where out knowledge of the system has this absolute, syllogistic character. However, for systems about which our knowledge is uncertain and for which we must reason in terms of levels of confidence, this approach is inadequate. Attempts to graft provisions for uncertainty onto rule-based approaches have proved to be inadequate. The current invention includes, and is inherently built around, a complete and accurate treatment of uncertainty.

BRIEF DESCRIPTION OF AN EMBODIMENT OF THIS INVENTION

In accordance with the principle of this invention, the shell of an expert system is organized according to Bayes' theorem. The knowledge base includes terms that represent the states of the systme characterized, along with, for each, associated probabilities that, if the system is in that state, certain evidentiary information would be present. The input to the system (evidentiary information or observables such as keyboard inputs, meter readings, etc.) is quantified or discretized so that a diagnostic module operative under the control of the shell can make a diagnosis in the form of a probability distribution for the system being in various states, given the evidence. The invention is based on the recognition that the time-dependent data relating to an observed system provide valuable information for diagnosis with respect to that system. The evidentiary information, accordingly, is time dependent, consisting of time trajectories of the observable variables. The knowledge base, moreover, specifies the set of all possible trajectories of a variable and assigns an associated probability value to each. The diagnosis is based on the observed time-dependent trajectories acquired as a sequence of digitized representations.

DETAILED DESCRIPTION OF AN EMBODIMENT OF THIS INVENTION

Diagnosis

Figure 1:
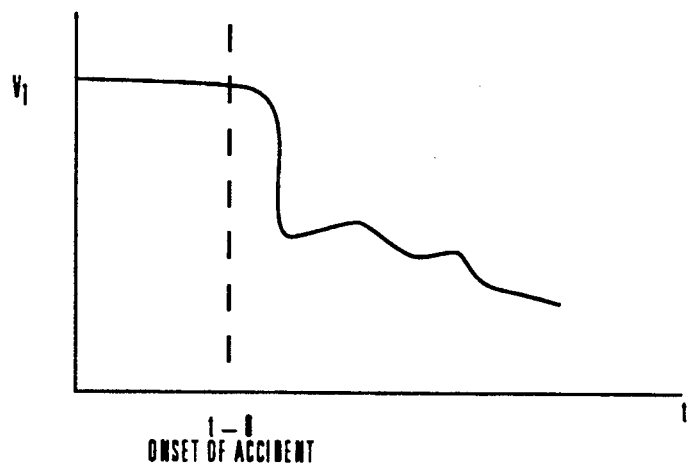
FIG. 1 is a graph of a variable $V_1$ plotted against time, showing the time trajectory of the variable $V_1$.

The term "diagnosis" may be explained in the following way: Suppose we have a system, S, which could be anything from a human being to a nuclear power plant to an industrial extrusion machine or an automatic transmission. At any given moment, a system may exist in one of various possible states. Let S denote the set of all possible states of S, and let s be a variable point in the set S.

We shall call s the "state variable" of the system S. For example, if S were a human being, and we were concerned with medical diagnosis, then s could represent various possible diseases or illnesses. The "state space," S, would then be the set of all possible diseases, including the state of health; i.e., no disease at all.

If S were a nuclear plant, then s could represent, for example, "failure of auxiliary feedwater pump," "steam generator tube rupture," "large leak in the primary coolant system," etc. The space S then encompasses all things taht could be wrong with the plant, including the state "Nothing wrong, all equipment working perfectly."

If S were an automotive transmission or a complicated industrial machine, S would range over the space of all possible defects or malfunctions of that equipment.

The problem of diagnosis is to determine the condition or states of the system, given some body of evidence, E. E would then include all of the signs, symptoms, test results, meter reading, etc., that we have.

In real life, there is never sufficient evidence for us to know exactly the state of the system; there is always some degree of uncertainty. We may express this uncertainty as a probability distribution, p(s), where s ranges over S, and by convention $$\int_S p(s)ds = 1.0 \tag{1}$$

i.e., the integral (or sum) of the probability of all possible states is 1.0.

Now let us write $p(s|E)$ to denote our probability (i.e., our degree of confidence) that system S is in state s, given the evidence E. This notation makes it explicitly clear that our state of confidence or knowledge about s is conditional upon, and "depends" upon, the evidence or information we have.

The problem of diagnosis may now be expressed as "Given E, find the probability distribution over S," or, for short, "Find the function $p(s|E)$."

Bayesian Diagnosis

By "Bayesian diagnosis" we mean the process of finding $p(s|E)$ by use of Bayes' theorem. In our current notation, this theorem may be written $$p(s|E) = \frac{p_0(s)p(E|s)}{\int p_0(s)p(E|s)ds} \tag{2}$$

where $p_0(s)$ is our distribution prior to learning evidence E, and $p(E|s)$, called the "likelihood function," expresses our confidence or degree of belief that the evidence E would be observed if the system truly were in the state s.

In Equation (2), s is understood to range over S, and E is regarded as a particular point in a space, E, of all possible sets of evidence.

Discretization

It is essential that the infinite spaces S and E be discretized (i.e., made finite) as an approximation so that practical computations may be carried out. In the case of S, the discretization is done by partitoning S into a finite number of disease or malfunction categories.

In "Outline of COPILOT, an Expert System for Reactor Operational Assistance, Using a Bayesian Diagnostic Module" (*Reliability Engineering and System Safety*, 22, pp. 411–440, 1988), we disclose a scheme for discretizing E in the static case. In this scheme, we consider E to be the space of all possible values of a vector variable, V, $$V = \begin{bmatrix} V_1 \\ V_2 \\ \cdot \\ \cdot \\ V_M \end{bmatrix}$$

containing M components $V_1, V_2, \ldots V_m, \ldots V_M$. These components are called the "observable variables." For example, in the medical case, $V_1$ might be the patient's temperature. In the nuclear plant, $V_2$ might be the pressurizer pressure, etc.

The central idea then is that information is captured and encoded by specifying the values of one or more of these observables. Thus, let $V_m$ be the set of all possible values of the variable $V_m$. When this variable is assigned a particular value, say $v_m$, in $V_m$, the variable is said to be "specialized" or "instanciated." We may also call this assignment a "symptom." Thus, a symptom is "The patient's temperature is 103° F." or "The pressurizer pressure is 1,400 psig."

It is by the step of specializing a variable that information is captured; i.e., information is captured when what before was variable is now made definite.

This idea of specializing a variable may be made more powerful by broadening the meaning of "specializing." Specializing means not only assigning a particular value $v_m$ to $V_m$ but also restricting $V_m$ to some subspace of $V_m$. If we now broaden the interpretation of $v_m$ to mean "subspace of $V_m$," then we may again say that information is encoded by specializing $V_m$ to $v_m$.

To discretize E, therefore, we partition each of the $V_m$ into subsets $v_m$, thus making a discrete version $V_m^d$ of $V_m$. The discrete version of E (i.e., $E^d$) is then the Cartesian product of the $V_m^d$. With this done, a particular piece of evidence E is encoded as a statement that the variable V is at a particular point of $E^d$. The likelihood function is implemented by writing down in tabular form the number's $p(v_m|s_i)$.

Trajectories

In many important applications such as nuclear plant accident diagnosis, the important evidence is contained not in the value of a meter reading at a particular time but rather in the whole time trajectory of values up to that point. It is clear, for example, that if the pressure is excessively high, it is important to know that the rise in pressure occurred in the last 30 seconds rather than over the last month. In other words, if $V_m$ represents the pressurizer pressure, then the evidence we have at time t is not just the value $V_m(t)$ but rather the whole trajectory, $v_m(\tau)$, for all $\tau \leq t$. The present disclosure relates to a method and apparatus for handling this type of trajectory information in the process of Bayesian diagonosis. This method includes forming a knowledge base in a digitized and time trajectory form, inputting evidence digitized and in a time trajectory form, and organizing a diagnostic module to respond to such data to provide the desired probability distribution.

Consider first the case of a single observable variable, $V_1$. During a nuclear accident, $V_1$ is a function of time, $V_1(t)$; as for example, in FIG. 1.

At any point, t, in time, therefore, the evidence we have is the whole trajectory, $V_1(\tau)$, for all $\tau \leq t$. The space $V_1(t)$, in this case, therefore, is the space of all possible trajectories up to time t. This is a function space, which is not only an infinite space but also an infinite dimensional space. The problem therefore is how to specify a likelihood function over this space.

Figure 2:
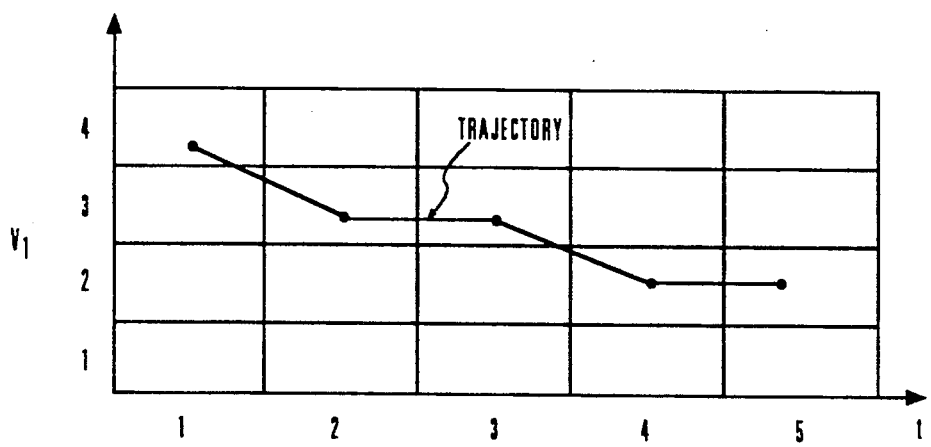
FIG. 2 is a graph discretized variable $V_1$ plotted against time, showing the discretized trajectory of $V_1$.

The solution to this problem involves the discretization of this infinite dimensional space. Once this is clearly appreciated, a practical procedure can be set forth. A procedure for discretizing the function space consists of discretizing both the $V_1$ axis and the time axis, obtaining a grid, for example, as in FIG. 2.

We now approximate the infinite dimensional space, $V_1(t)$, by the finite space, $V_1^d(t)$, of all trajectories defined on this grid. If the grid is $4 \times 5$, as in this example, then our finite space contains $4^5$ different trajectories, a manageable number. The likelihood function then is specified by giving a probability to each of these $4^5$ trajectories. That task is made manageable by dividing the whole set of $4^5$ trajectories into three subsets called "explicit," "residual," and "impossible."

Figure 3:
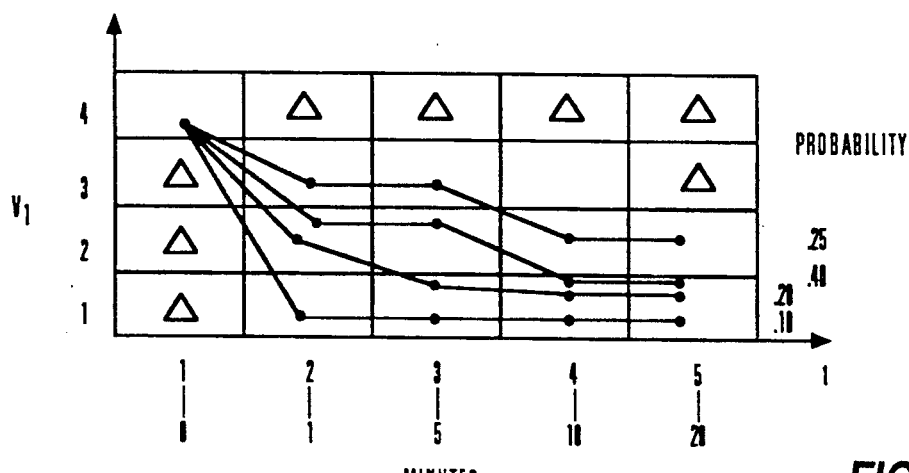
FIG. 3 is a set of graphs of discretized variable $V_1$ plotted against time showing a plurality of discretized trajectories of variable $V_1$ along with a likelihood (probability) value specified for each.

The trajectories in the explicit category are individually written down and assigned a probability, as in FIG. 3. Impossible trajectories are defined as any trajectory passing through a grid box denoted by a triangle, as in FIG. 3. Such trajectories are considered to be impossible for engineering reasons, given the state of the plant, $s_j$. In the likelihood function, they are assigned a minimal value, say, $10^{-6}$, which may be thought of as a "nominal zero" and represents the possibility of erroneous meter readings, for example.

All remaining scenarios are considered to be in the residual category. These divide equally the probability remaining after subtracting the sum of the explicit probabilities.

Now, given as evidence any set of meter reading, say, $$E=\{V_1(\tau_1)=4,\ V_1(\tau_2)=3,\ V_1(\tau_3)=3\} \quad (3)$$

The likelihood function $p(E|s_i)$ is evaluated by summing the likelihoods of all trajectories (including the residual trajectories) that are consistent with these readings. Note that the evidence need not include a meter reading at all times. In the true spirit of Bayes' theorem, the diagnosis is based on whatever information is available at the moment. When new information is obtained, the diagnosis is updated.

The knowledge base is readily constructed by the plant engineer, and the diagnostic process is easily implemented into software on desk-type computing machines.

Figure 4:
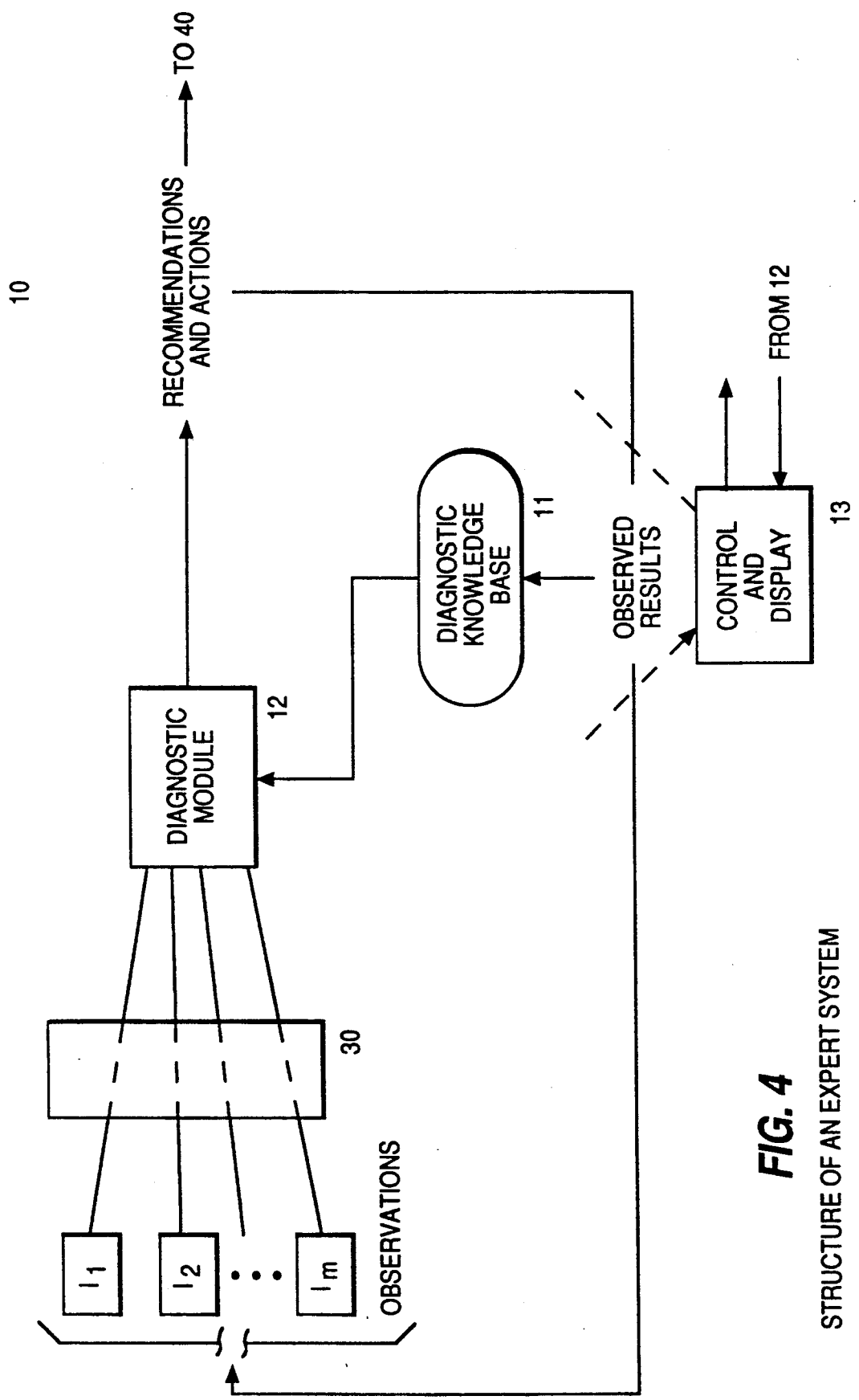
FIG. 4 is a block diagram of an expert system organized by Bayesian principles and having knowledge bases and observables structured for manipulation by a software shell operative according to Bayesian principles.

FIG. 4 shows a block diagram of an expert system organized in accordance with the principles of this invention. The system includes a diagnostic knowledge base represented at 11 along with a diagnostic module 12, which is operative with the diagnostic knowledge base. Inputs to the system are represented by the blocks $i_1, i_2, \ldots i_m$. The input may originate from sensors, keyboard entries, etc. The inputs acquired by means 30 are stored in the diagnostic module 12.

Data from the diagnostic knowledge base 11 also are input to diagnostic module 12. The data from the knowledge base contain representations of the possible states of the system stored in a lookup table (LUT) in association with representations of the likelihood that, for a given state, the observed evidence (i.e., set of trajectories of observables) would actually occur. It should be clear that data in the diagnostic knowledge base are stored in a time-dependent form that is significantly different from that of prior art expert systems and that time-dependent observables are coded in a discretized and trajectory form that is also significantly different from that of prior art expert systems. It also should be clear that the diagnostic module is responsive to inputs of the form described to provide a probability distribution p(s) over the "state space" of the system, which is the system's degree of confidence that the system is actually in a state s based on all of the information available to it. The output of the decision module is a control action based on the complete probability distribution at that instant. The recommended action may be presented on a display that is part of control and display block 13, which conveniently comprises a computer.

Figure 5:
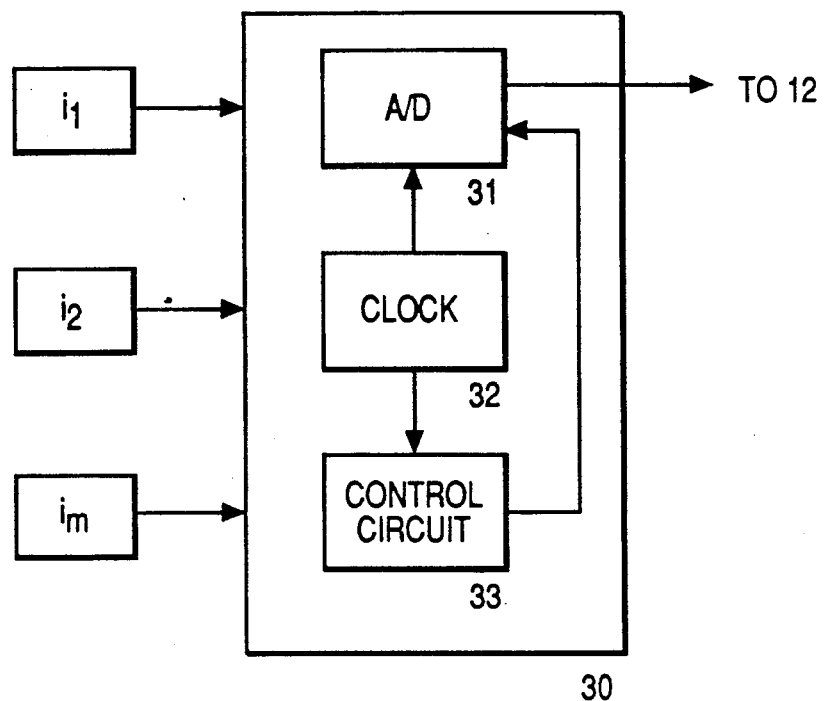
FIGS. 5 and 6 are block diagrams of portions of the system of FIG. 4.

The various sensors for acquiring the observables are typically analog sensors. Block 30 of FIG. 4 includes an analog-to-digital converter operative to acquire a timed sequence of readings from the sensors responsive to clock signals. FIG. 5 shows block 30, including analog-to-digital (A/D) converter 31 and a clock 32 as well as a control circuit 33. A related sequence of readings is applied to A/D converter 31, each reading being enabled by one of a sequence of clock pulses under the control of control circuit 33. An encoded set of data representative of sensor readings over time (i.e., a trajectory) is thus stored in diagnostic module 12 at a sequence of addresses starting at a specified start address.

Access to the representation of the trajectory information is obtained by selecting a start address and interrogating the store to access the readings stored in a predetermined number of addresses starting at that start address. Thus, data in diagnostic knowledge base 11 are accessed by means, for example, of an address generator, which accesses the selected start address and the succession of addresses at which the related trajectory data are stored under the control of a control circuit. The addresses may be stored in a read only memory (ROM) in an address string or sequence starting at the start address accessed by the address generator. The address string thus may be accessed responsive to clock pulses.

Figure 6:
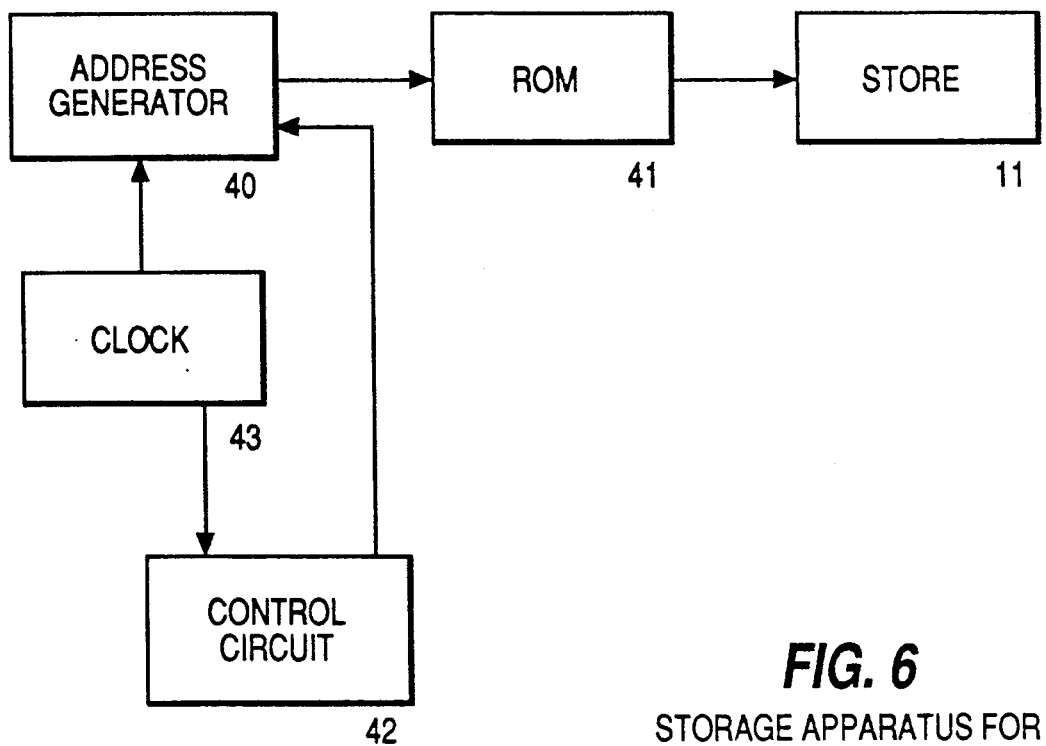

FIG. 6 shows an address generator 40, the output of which is applied to knowledge base 11 via a ROM 41 for selecting a start address under the control of control 42. The address generator is incremented in response to clock pulses from clock 43 for interrogating the related trajectory data also under the control of control circuit 42.

Figure 7:
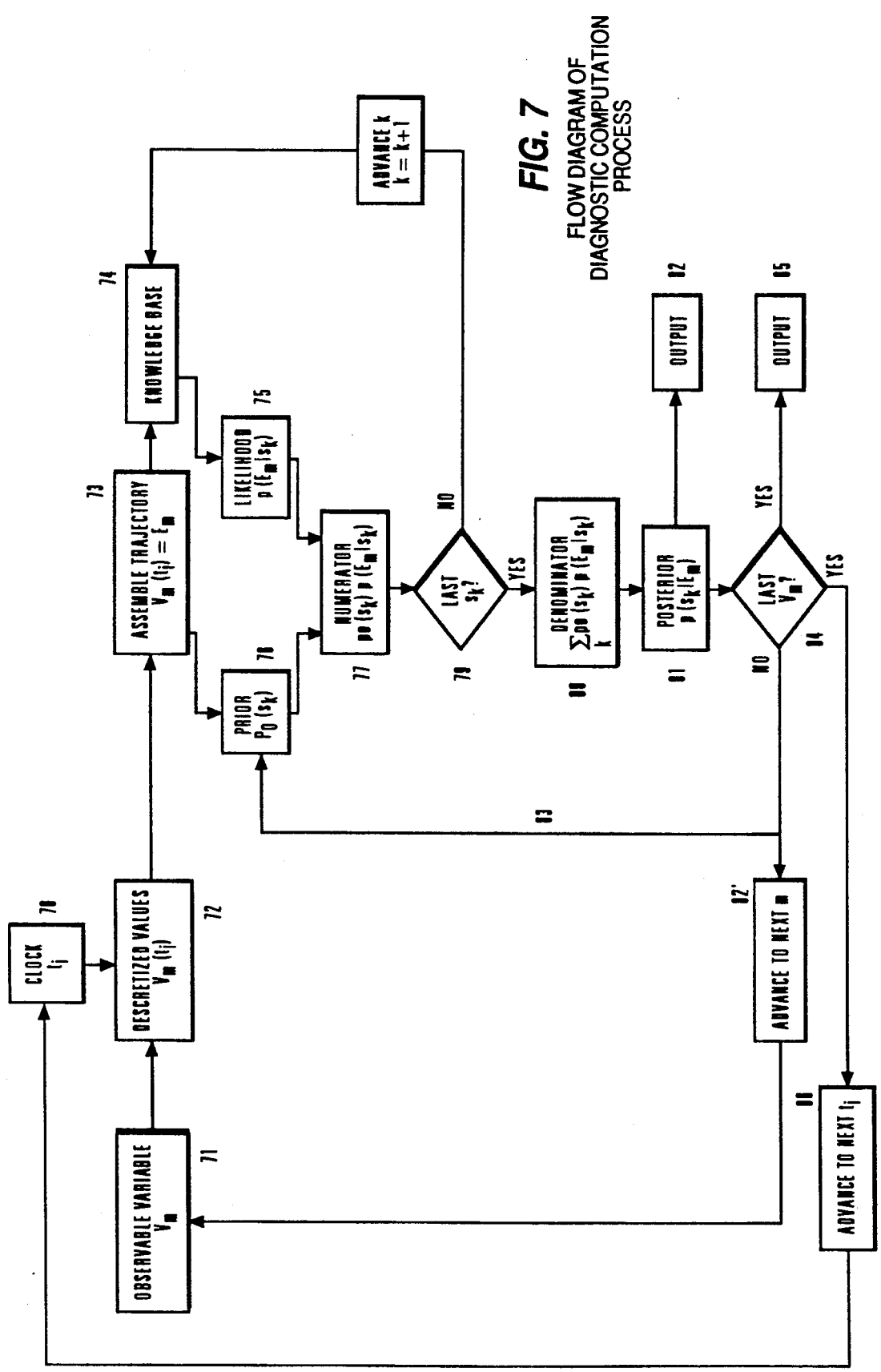
FIG. 7 is a flow diagram of the time-dependent operation of the Bayesian software shell for the system of FIG. 4.

We will now discuss the operation of the system of FIG. 4 in accordance with a flow diagram of the Bayesian software shell, shown in FIG. 7 for the operation of the system of FIG. 4. The overall system of FIG. 4 along with the operation of the system and examples of that operation are disclosed in the above-mentioned publication. The operation disclosed in that publication is for time-independent operation. In accordance with the principle of the present invention, the knowledge base, the observables, and the diagnosis are time dependent.

The operation of the basic diagnostic module is diagrammed in FIG. 7. The system contains, first of all, a clock that marks discrete time intervals, $t_i$, as shown in block 70. The system is continuously fed signals coming from a set of detecting instruments. These detector readings constitute the "observable variables," $V_m$, as represented by block 71.

The diagnostic period begins with the occurrence of some incident, such as a control rod trip, or, alternatively, at preestablished regular intervals. Once the diagnostic period begins, the system discretizes and records the readings of the detectors at each $t_i$, as represented by block 72 and as discussed in connection with FIG. 5. These descretized values, $v_m(t_1)$, $v_m(t_2)$, etc., are assembled into a string, as represented by block 73. This string is called the "trajectory" of the mth variable, and is denoted in the diagram by $v_m(\tau)$, where $\tau$ is understood to be a discrete time variable ranging from the beginning of the diagnostic period to the current time, $t_i$. In the diagram, this trajectory is also labeled $E_m$, meaning the evidence from the mth observable.

Beginning with the first observable, $m=1$, the system enters the knowledge base with the trajectory $v_1(\tau)$, and obtains the likelihood, $p(E_1|s_1)$, for the first possible system state, $s_1$. Multiplying this likelihood by the prior probability, $p_0(s_1)$, for this state (also obtained from the knowledge base), the system obtains the numerator for $s_1$. These steps are represented by blocks 74 through 77. The system repeats this step for each state $s_k$.

When the numerator has been calculated for all states, the system calculates the denominator and the final (i.e., the posterior) probability distribution, $p(s_k|E_m)$, and outputs this tabularly through the printer and graphically on the monitor. These steps are represented by blocks 79 through 81. The system then advances to the next observable variable, as indicated by blocks 82 and 84, sets the prior equal to the posterior just found, as indicated by line 83, and repeats the calculation. When the system has cycled in this way through all of the observable variables, it then outputs (84) the posterior probability distribution applicable to that point in time, and advances (86) to the next time step where it repeats the process.

The system is initialized by the preparation of a diagnostic knowledge base stored in block 11 of FIG. 4. The knowledge base is prepared by plant engineers and includes statements of all possible states of the system.

In the context of the system of FIG. 4 and the time-dependent operation of that system as discussed in connection with the flow diagram of FIG. 7, we can turn our attention to a practical implementation of the system.

EXAMPLE 1

Sample Knowledge Base

The following is a simple example to clarify the previous discussion.

Table 1 shows, in digitized form, an example knowledge base, which is input by the plant expert. It consists of three observable variables (pressurizer pressure, pressurizer level, and containment humidity) and four potential predefined accident initiators (very large LOCA, large LOCA, medium LOCA, and small LOCA) where LOCA is defined as loss of coolant accident. The full range of each variable is divided into four bins with a discrete value for each bin; e.g., empty, low, normal, and high for pressurizer pressure. The time axis is discretized into six bins: 0− (preaccident conditions), 0+ (conditions immediately after the accident), 1, 5, 10, and 20 minutes. Table 1 shows 12 boxes corresponding to the three observables times the four initiators. Each box contains strings of numbers. The six positions in the string represent the six time bins.

TABLE 1

| Symbol | Digital Representation of the Knowledge Base | | | | | | |
|---|---|---|---|---|---|---|---|
| | Very Large LOCA (prior = 2.87E-5) | | Large LOCA (prior = 2.19E-2) | | Medium LOCA (prior = 5.02E-2) | | Small LOCA (prior = .9276) |
| PP | 144444 | | 144444 | | 144400 | | 140000 |
| | 203300 | | 210330 | | 220000 | | 220000 |
| | 300000 | | 300000 | | 311111 | | 311111 |
| | — | | — | | — | | — |
| | 432223 | .095 | 433223 | .60 | 433344 | .75 | 434444 .02 |
| | 432222 | .10 | 433222 | .10 | 433334 | .04 | 433444 .30 |
| | 432221 | .05 | 432222 | .15 | 433333 | .06 | 433344 .30 |
| | 432211 | .03 | 432221 | .03 | 432223 | .06 | 433334 .30 |
| | 431111 | .10 | 431111 | .03 | 432222 | .02 | 433333 .03 |
| | 422111 | .02 | 421221 | .03 | — | | |
| | 421111 | .10 | 421111 | .02 | RES = .07 | | RES = .05 |
| | 411111 | .50 | — | | | | |
| | — | | RES = .04 | | | | |
| | RES = .005 | | | | | | |
| PL | 144400 | | 144000 | | 144001 | | 140002 |
| | 233300 | | 233000 | | 230000 | | 200111 |
| | 402000 | | 400000 | | 400000 | | 400000 |
| | — | | — | | — | | — |
| | 311244 | .01 | 311444 | .50 | 321444 | .60 | 334444 .30 |
| | 311234 | .01 | 311344 | .15 | 321344 | .10 | 333444 .40 |
| | 311124 | .08 | 311144 | .10 | 321244 | .10 | 323444 .05 |
| | 311123 | .01 | 311133 | .10 | 321134 | .06 | 322444 .05 |
| | 311113 | .01 | 311113 | .04 | 311134 | .02 | 322344 .05 |
| | 311112 | .01 | 311112 | .01 | 311123 | .02 | — |
| | 311111 | .85 | — | | — | | RES = .15 |
| | — | | RES = .1 | | RES = .1 | | |
| | RES = .02 | | | | | | |
| CH | 100222 | | 100222 | | 140111 | | 144001 |
| | 311111 | | 301111 | | 300000 | | 300000 |
| | 400000 | | 400000 | | 400000 | | 400000 |
| | — | | — | | — | | — |
| | 244444 | .06 | 234444 | .02 | 224444 | .01 | 223444 .01 |
| | 234444 | .70 | 224444 | .07 | 223444 | .10 | 223344 .02 |
| | 233444 | .10 | 223444 | .70 | 222444 | .20 | 223334 .15 |
| | 224444 | .10 | 223333 | .08 | 222344 | .30 | 223333 .50 |
| | 223444 | .02 | 222344 | .10 | 222233 | .30 | 222233 .15 |
| | 222333 | .01 | 222333 | .02 | 222223 | .04 | 222223 .05 |
| | — | | — | | — | | 222222 .02 |
| | RES = .01 | | RES = .01 | | RES = .05 | | — |
| | | | | | | | RES = .1 |

In each box, the first three strings represent the zero nodes. Then, below the first separation line, are the strings representing the explicit trajectories, each with its associated probability. Finally, below the second separation line, are the residual likelihoods.

The information in a typical box is also represented graphically in FIG. 3. The solid curves in FIG. 3 represent the "explicit trajectories." Each is assigned an explicit probability value. The triangles represent points, which, in the experts' opinion, are impossible for the specific initiating event. These are called "zero nodes." Any trajectory passing through a zero node is considered to be an "impossible trajectory." Such a trajectory could be obtained only if the instrument has failed (or been misread). To such trajectories, a small likelihood (e.g., 10E-6) is assigned, which is taken as the probability of instrument malfunction or misreading. All remaining trajectories (i.e., neither explicit nor impossible) are called "residual trajectories." The set of such trajectories is assigned the "residual-likelihood" given at the bottom of each box. This residual-likelihood is divided equally among all non-impossible trajectories.

All initiating events have prior probabilities that express our knowledge prior to any evidences from the plant during the actual incident.

Sample Diagnoses

An example diagnosis using the above knowledge base involves the following simulated scenario.

| Evidence Number | Symbol | Value | Time |
|---|---|---|---|
| 1 | $PP(0+) = 3$ | 1,200 to 1,800 psi | Beginning of Accident |
| 2 | $PL(0+) = 1$ | Empty | Beginning of Accident |
| 3 | $CH(0+) = 3$ | High | Beginning of Accident |
| 4 | $PP(1) = 2$ | 100 to 1,200 psi | 1 Minute |
| 5 | $PL(1) = 1$ | Empty | 1 Minute |
| 6 | $CH(1) = 4$ | 100% | 1 Minute |

Evidence number 1, the reading $PP(0+)=3$, is encoded as 43 . . . (At $t=0-$, the normal operation value is 4.) The likelihood of this evidence is the sum of the probabilities of all trajectories consistent with this evidence; i.e., all trajectories starting with 43 . . . For a very large LOCA, Table 1 (first box) shows a sum of $0.095+0.1+0.05+0.03+0.1=0.375$ plus the residual likelihood (0.005/3), making a total of 0.37667. Similarly, for a large LOCA, the likelihood is 0.93. For a medium LOCA, it is 1.0, and for a small LOCA, 1.0.

These likelihoods are now multiplied by the corresponding prior probabilities (see heading of Table 1) to yield the numerator of the Bayes' formula. Each numerator is divided by a common denominator, which is the sum of all of the numerators. The results are the posterior probabilities: 1.0823E-5, 2.0395E-2, 5.0249E-2 and 0.92934 for the above mentioned initiators, respectively.

Evidence number 2 (encoded as 31 . . .) has likelihoods of 0.99, 0.95, 0.09, and 0.05 for these initiators; the last one having no explicit trajectories and is thus evaluated only by the residual likelihood. To account for both (evidence numbers 1 and 2), their likelihoods are multiplied, and the product put into the Bayes' formula again to produce posterior probabilities of 1.5225E-4, 2.7532E-1, 6.4261E-2, and 6.6027E-1.

Evidence number 3 is handled in the same way as number 2; i.e., the product of all three likelihoods (evidence numbers 1, 2, and 3) is the combined likelihood of the situation. Thus, this product is multiplied by the corresponding prior and put into the Bayesian formula.

Evidence number 4 (encoded as 432 . . .) occurs at a new time step (1 minute) and has new likelihoods of 0.2758333, 0.1866667, 0.115, and 0.0166667 for the above mentioned initiators, respectively. These likelihoods are then multiplied by the likelihoods of the already known evidence numbers 2 and 3. (Being of the same variable, evidence number 4 actually replaces evidence number 1.) The posterior probabilities are 4.1607E-3, 2.1072E-1, 3.6434E-2, and 7.4868E-1, respectively.

In the same manner, evidence number 5 replaces evidence number 2, and yields likelihoods of 0.99, 0.925, 0.0566667, and 0.0125, and posteriors 6.0952E-2, 8.2387E-1, 5.2775E-2, and 6.2407E-2, correspondingly.

Evidence number 6 (encoded as 234 . . .) meets a zero node in the small LOCA initiator and therefore has a likelihood of 10E-6. For the medium LOCA, only the residual likelihood is equally shared among 12 trajectories (6 of them explicitly specified); thus, its likelihood is $0.05/12=0.0041667$.

The end results for all six evidences are 6.4152E-2, 9.1994E-1, 1.5910E-2, and 2.2578E-6 for very large, large, medium, and small LOCA initiators, respectively.

Note that, although the likelihoods product of the very large LOCA is $(0.2758333*0.99*0.701111=0.1914558)$ is greater than that of the large LOCA $(0.186667*0.925*0.0208333=0.003597)$, the posterior probability of the large LOCA is still greater than that for the very large LOCA because the prior for the very large LOCA is so much smaller.

Storing and Processing Trajectories

The method of discretizing trajectories, given above, makes it quite simple to store the trajectories in the computer in the form of digital strings, the digits representing the value bins, and their ordinal location representing the time points. Table 1 gives examples of this form of storage.

During the diagnosis, the instrument readings are also reported as discrete values, and as the report advances with time, a scenario string is created. This scenario string is matched with the strings in the knowledge base for likelihood determination. Note that during the course of the diagnosis, the input scenario string might match more than one string in the knowledge base (especially at early time points). In that case, the likelihood of the input scenario is the sum of all matching evidence strings.

For example, if the knowledge base contains the strings

431222: 0.20
431223: 0.15
431422: 0.22
432123: 0.35
431224: 0.05 and the scenario reported up to the third time point was 431, its likelihood is $0.20+0.15+0.22+0.05=0.62$.

In an observed trajectory, if a time point is skipped (no observation), an asterisk (*) holds the space for that time point. These strings are valid observed trajectories.

For example, an evidence having a value of 4 at the first time point, a value of 1 at the third time point, and a value of 2 at the fifth and sixth (second and fourth not observed) will be represented in the computer as the following string: 4*1*22.

The likelihood assigned to such a string is as always the sum of all trajectories in the knowledge base consistent with the observed string. Thus, in the above example, we would assign $0.2+0.22=0.44$.

Zero Nodes And "Impossible Trajectories"

When constructing the knowledge base, expert evaluations are made to determine what symptom values are impossible for a given initiator, indicating that if such a value is observed, that initiator cannot be the one that caused the observed phenomenon. These values are called "zero nodes."

A trajectory passing through such a zero node should have a likelihood of zero, but the value 0.000001 (10E-6) is assigned instead. The idea is to allow for possible, although unlikely, malfunctioning or misread instruments that give misleading information. Thus, an initiator is never absolutely excluded from the diagnosis but rather gets a very low posterior in such a case.

If a trajectory passes through a zero node for a given initiator, the posterior probability for that initiator is reported in a different color on the computer screen. This calls to the user's attention that the initiator is impossible, given the evidence, unless there has been a malfunctioning or misreading of the instruments.

Residual Trajectories

When the knowledge base is being constructed, the knowledge engineer identifies explicitly all of the trajectories having significant probabilities. To save the trouble of separately identifying and quantifying the myriad of possible minor scenarios, the engineer can, if he wishes, lump all of these into a category called the "residual scenarios" and assign a residual likelihood to the whole category. This residual likelihood can also be automatically derived by the software by deducting all explicitly specified likelihoods from 1.00.

To make it simple, the residual likelihood is added not only to the residual trajectories but also to the explicit ones. This means that the actual likelihoods of explicit trajectories are the sum of the explicit probability and the residual probability per trajectory.

The way that the residual likelihoods for certain trajectories are calculated is as follows: The number of all possible trajectories is determined by calculating the number of combinations of trajectories going through possible bins up to the present time of diagnosis. Zero nodes are not considered. For example, in Table 1, the symptom PP (pressurizer pressure) at very large LOCA has one possible value bin at time 0—(bin 4), three possible bins at time 0+(1, 2, and 3), and two possible bins at times 1 and 5 each (1 and 2). Thus, for a time point of 5 minutes, there are $1 \times 3 \times 2 \times 2 = 12$ possible trajectories, and since the residual likelihood for the total array is 0.005, the residual likelihood per trajectory for 5 minutes is $0.005/12 = 0.000416667$.

Structured Knowledge Base And Method Of Aggregation

Typically, observed symptoms point at one accident initiator or a group of several initiators of the same type. The more evidence accumulates, the sharper the inference gets. Thus, during most of the analysis, a very small number of initiators have significant posterior probabilities, and all of the others have very low posteriors.

This causes two difficulties: first, the diagnosis procedure is time-consuming and inefficient, and second, the table of results is loaded with insignificant data.

The idea of a structured knowledge base is to deal with categories or families of accident initiators instead of individual initiators; e.g., LOCA initiators, transients, multiple failures, etc.

Figure 8:
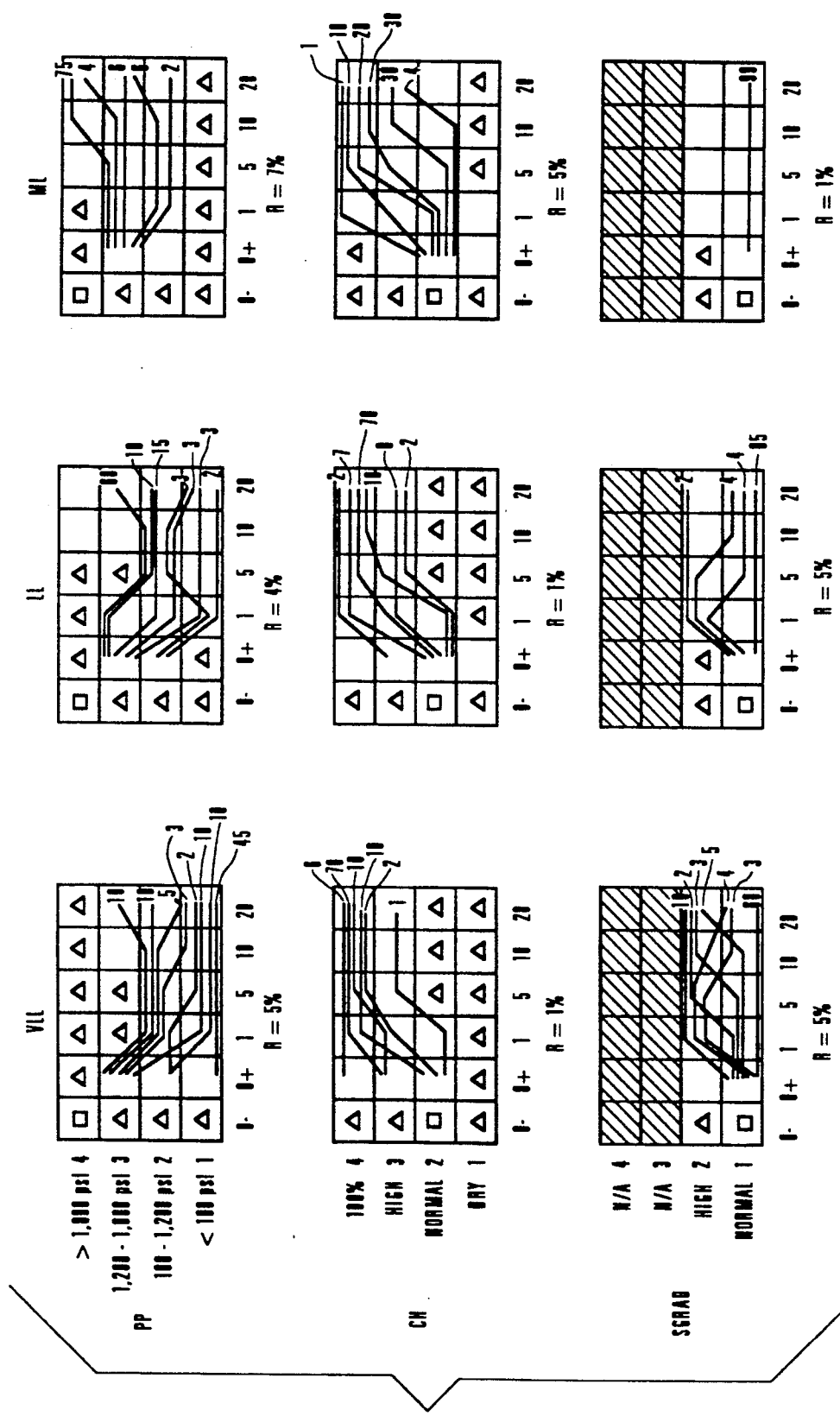
FIG. 8 is a set of graphs representing the structure of the knowledge base.

The aggregation into categories can be done for several depth levels, as illustrated in the next section by FIG. 8.

A structured knowledge base is created by starting at the base of a pyramid with the likelihood function (i.e., the knowledge base) at its maximum level of detail. One then aggregates these bases into larger and larger categories, step-by-step up the pyramid.

The principle of aggregation at any level is as follows.

Suppose we wish to aggregate the states $x_1, x_2, \ldots x_N$ into a single state x. Let $p(E|x_n)$ be the knowledge base for $x_n$, and let $p_0(x_n)$ be the prior for $x_n$. The aggregation is then done by $$p_0(x) = \sum_1^N p_0(x_n) \quad (4)$$

$$p(E|x) = \frac{1}{p_0(x)} \sum_1^N p_0(x_n) p(E|x_n) \quad (5)$$

Once the structured knowledge base is developed, diagnosis with it is carried out iteratively, from the top of the pyramid downward; that is, a first diagnosis is done at the first level below the top. Based on the results at this level, some categories are disaggregated to the lower level. The diagnosis and disaggregation are repeated at this level and so on down the pyramid.

The criterion that tells when to split a category family is of several types at the user's choice; e.g., split on largest probability, largest likelihood, largest relative change, etc. The actual criterion is selected by the user.

The end result of this kind of analysis produces the individual initiators with the largest probabilities, while the insignificant initiators are lumped into aggregated initiator families.

Inclusion Of Human Actions

The key to including human actions is seen by referring to the knowledge base. Recall that the knowledge base in full generality was written $$p(E|x) \quad (6)$$

where $$E = \{I(\tau), c(\tau), \tau < t\} \quad (7)$$

Substituting Equation (7) into Equation (6), the knowledge base can be represented as $$p(I(\tau)|x, c(\tau)) \quad (8)$$

Equation 8 says to regard $c(\tau)$ as a parameter of the knowledge base. In other words, for any fixed, specific $c(\tau)$, Equation (8) becomes a knowledge base of exactly the same format we described above. Thus we discretize the space of control trajectories, $c(\tau)$; i.e., to specify those control actions we wish to include in our diagnoses. For each such included control action, we input a knowledge base as in the form disclosed. Equivalently, if we write $c_0(\tau)$ as meaning no control action, and think of $p(I(\tau)|x,c_0(\tau))$ as being a "baseline" or "reference" knowledge base, then for any other control action, we need to add to the knowledge base only those new diagrams of FIG. 3 type that differ from the reference case. Along with this, we need to include instructions on when to switch from the reference FIG. 3 diagrams to the new ones. These instructions are of the if-then form; that is, if control action such and such is taken in such and such time interval, then replace FIG. 3 diagram XYZ by diagram UVW, and so on.

Example 2

Hierarchically Structured Knowledge Base

Figure 9:
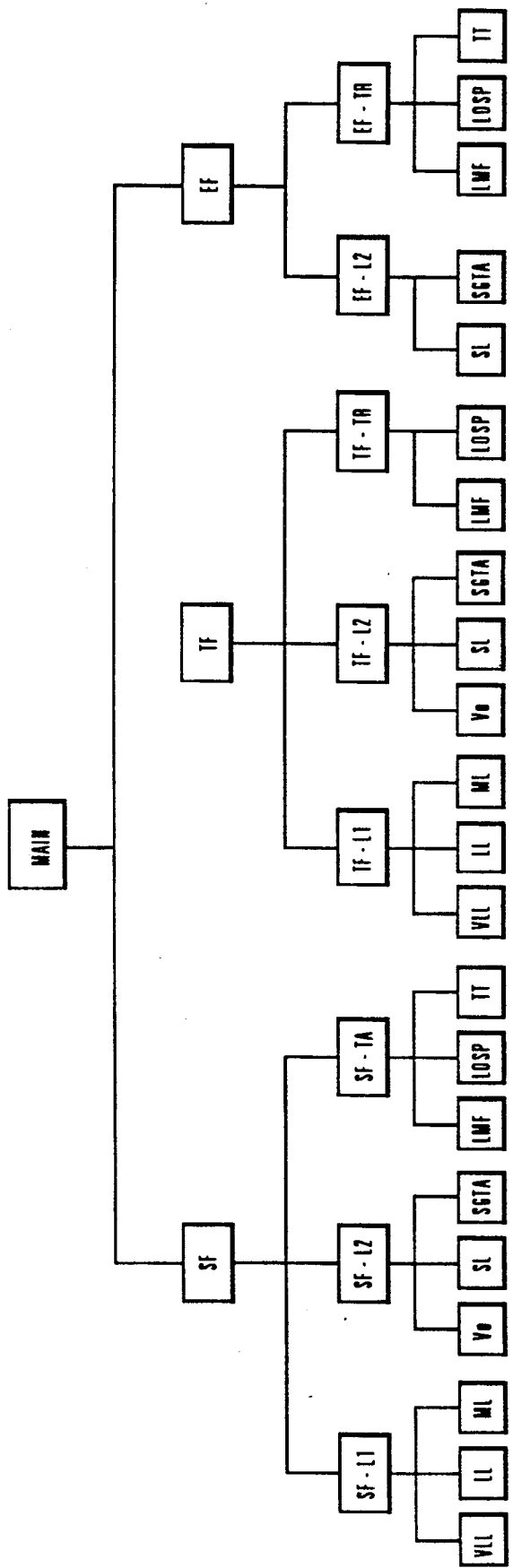
FIG. 9 is a table showing the hierarchial structure in the knowledge base of a set of system states, also called "accident initiators," in this example.

FIG. 9 shows an example of the hierarchical structuring of a knowledge base. In this example, the set of possible scenarios or states of the plant is as follows:

Single Failures (Initiating Events)

VLL—Very Large LOCA (beyond the capability of the ECCS system)
LL—Large LOCA
ML—Medium LOCA
$V_o$—Interfacing System LOCA outside Containment
SL—Small LOCA
SGTR—Steam Generator Tube Rupture
LMF—Loss of Main Feedwater
LOSP—Loss of Offsite Power
TT—Turbine Trip Multiple Failures (Initiating Event Followed by Additional Failure)

VLL and Failure of Turbine Trip
LL and Failure of Turbine Trip
ML and Failure of Turbine Trip
$V_o$ and Failure of Turbine Trip
SL and Failure of Turbine Trip
SGTR and Failure of Turbine Trip
LMF and Failure of Turbine Trip
LOSP and Failure of Turbine Trip
SL and Emergency Feedwater Failure
SGTR and Emergency Feedwater Failure
LMF and Emergency Feedwater Failure
LOSP and Emergency Feedwater Failure
TT and Emergency Feedwater Failure These 22 scenarios are aggregated into three higher levels, as shown in FIG. 9. At the first (lowest) level, VLL, LL, and ML are grouped to form category SF-L1 (single failure —large leak). $V_o$, SL, and SGTR are grouped to form SF-L2 (single failure —small leak); and so on. At the next level, the scenarios are aggregated into three categories: SF (single failure), TF (turbine trip failure following an initiating event), and EF (emergency feedwater failure following an initiating event). The final (highest) level, main, is simply the set of all scenarios included in this example. FIG. 9 is an example of what is called a "template." The bottom row of the diagram constitutes a subset of the scenario list from a recent pressurized water reactor (PWR), plant-specific probabilistic risk assessment. The particular subset chosen for this example is a compromise, selected to cover a broad range of damage conditions and yet to remain within a sufficiently small problem space to be easily trackable as an illustration. This subset has, in fact, grown during our development process—a demonstration of the facility of this approach as a step-by-step expandable system.

The aggregation process was developed so that there is no practical limit to the number of hierarchical levels or to the number of members in each family. The aggregation is carried out during the knowledge base generation phase.

Diagnosis using the aggregated knowledge base is essentially identical to the process used for an unaggregated knowledge base, since the data in the aggregated initiator families are of the same structure as those in the individual initiating events. The difference is that the structured knowledge base is analyzed top down. At first, only the aggregated scenarios are studied to detect which family contains the most probable states. When this family is found, it is split into its next lower components, and the diagnosis continues at a more detailed level.

The Reference Knowledge Base

For the case of no control actions, a portion of the prototype knowledge base is shown in FIG. 8. Six observable variables are used in this knowledge base:
PP=Pressurizer Pressure
CH=Containment Humidity
SGRAD=Steam Generator Radiation
FF=Feed Flow
TCORE=Core Outlet Temperature
DG=State of the Diesel Generator The discretized values for these variables are
PP:
> 1,800 psi
1,200–1,800 psi
100–1,200 psi
< 100 psi
CH:
100%
High
Normal
Dry
SGRAD:
High
Normal
FF:
Erratic
Normal
Low
Zero
DG:
Off
On

NUMERICAL EXAMPLES USING THE PROTOTYPE KNOWLEDGE BASE (EXAMPLE 2)

Case 1—A Simple Diagnosis

Figure 10:
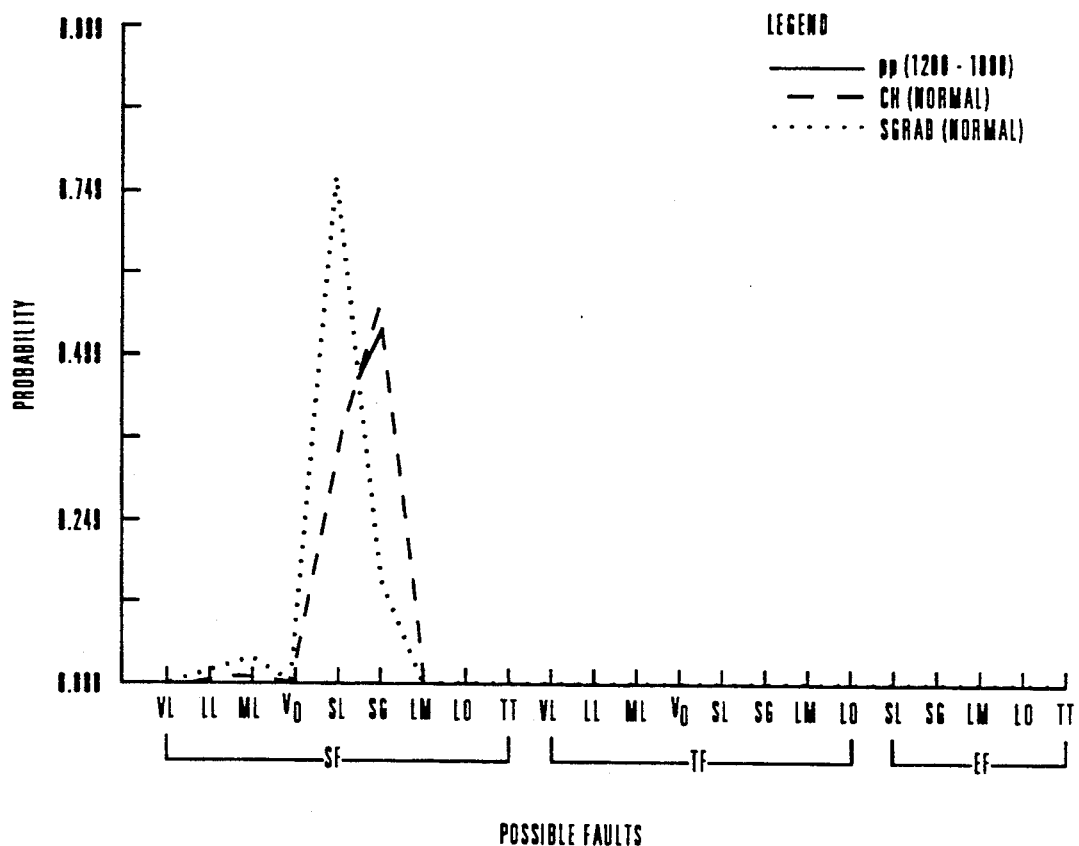
FIGS. 10 through 14 are graphs showing illustrative time-dependent diagnostic module outputs.
Figure 15:
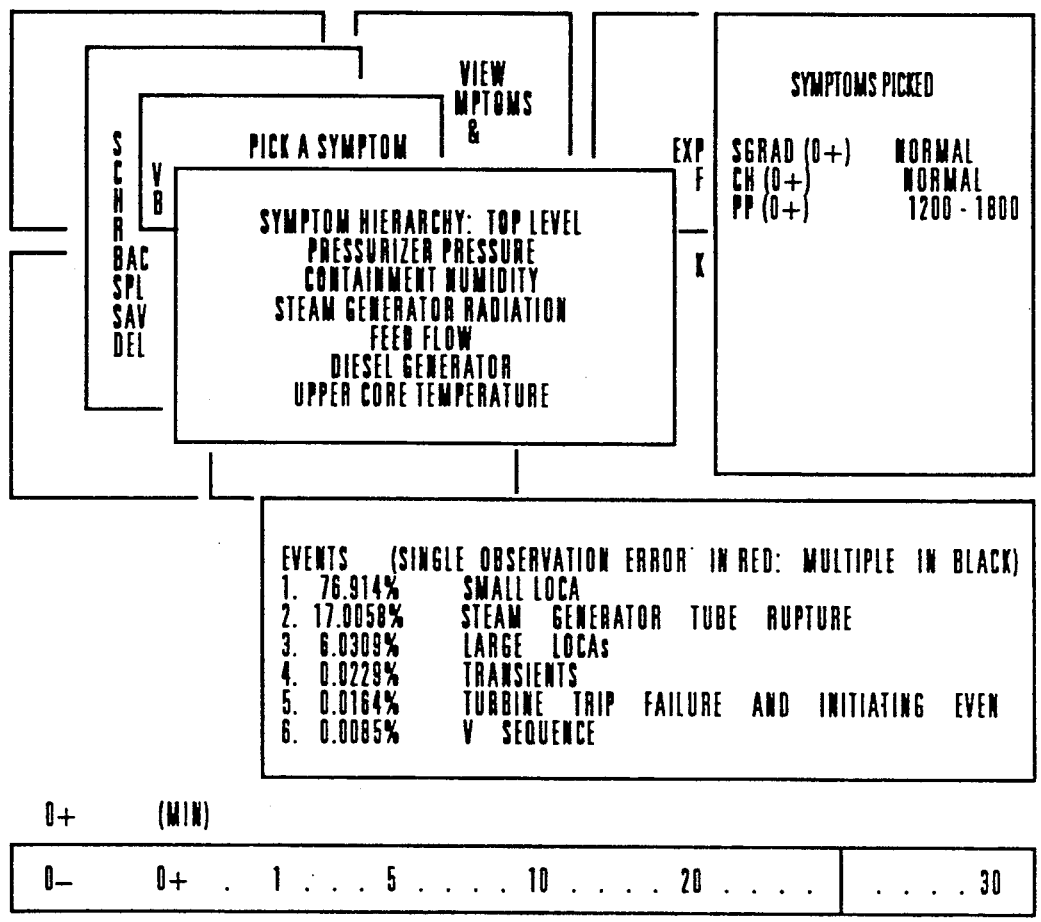
FIG. 15 is a representation of a computer screen displaying illustrative symptoms, probabilities, and times for an operator.

Let us imagine that operators in the control room have just witnessed a reactor trip. The gauges immediately indicate that pressurizer pressure has fallen, containment humidity is normal, and steam generator blow down radiation is normal. The shift technical advisor enters these symptoms to find the most probable cause of the accident. With these three symptoms, the diagnosis points to small LOCA (see FIG. 15) as the most probable (77%) accident initiator. The probability distribution over the range of possible initiators is shown in FIG. 10 progressively, as the three symptoms are entered. Knowing only that pressurizer pressure (PP) is between 1,200 and 1,800 psi immediately following the trip results in steam generator tube rupture (SG) having the largest posterior with small LOCA a close second. With normal containment humidity (HC), the diagnosis points a bit more strongly at SG. Adding that the steam generator radiation (SGRAD) is normal, however, shifts the emphasis to SL.

Of course, it would not be prudent to end the diagnosis with only three symptoms at the moment of the trip. A major strength of the disclosed system lies in its ability to handle time-dependent accident scenarios, as will be seen in the next example.

Case 2— Evolution Of The Diagnosis

The shift technical advisor continues to watch the instruments and sees that, at 1 minute, the pressurizer pressure is still in the range of 1,200 to 1,800 psi, and the steam generator radiation and containment humidity are both still normal. Similarly, at t=5 minutes, these instrument readings remain the same. The fact that the readings stay the same over time is actually new information that can, and should, be used to update the diagnosis.

Figure 11:
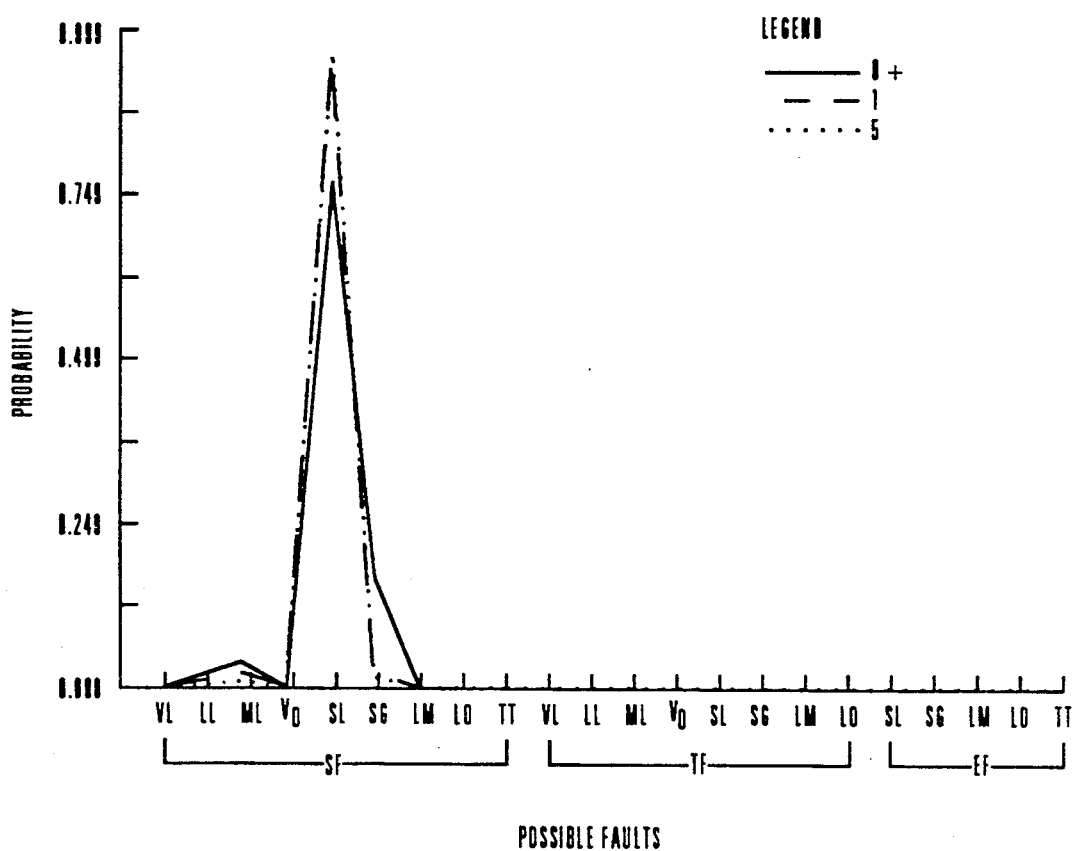

FIG. 11 shows the diagnosis updated at t=1 minute and t=5 minutes. At t=0+, right after the reactor trip, based on the evidence of the three sensors, we were 77% confident that the cause was a small LOCA, 17% confident that it was a tube rupture, and about 6% confident that it was a medium or large LOCA. Given the evidence that the same readings remain at t=1 minute, especially that the steam generator radiation is still normal, our confidence in small LOCA increases to 94%, while tube rupture decreases to 1.6%. Also, the fact that containment humidity is still normal decreases the probability of the accident being a medium or large LOCA.

At t=5 minutes, given that we still see no radiation or humidity, our confidence in small LOCA has now risen to 97%.

Cases 3A, 3B, And 3C—Variation Of Symptoms

Figure 12:
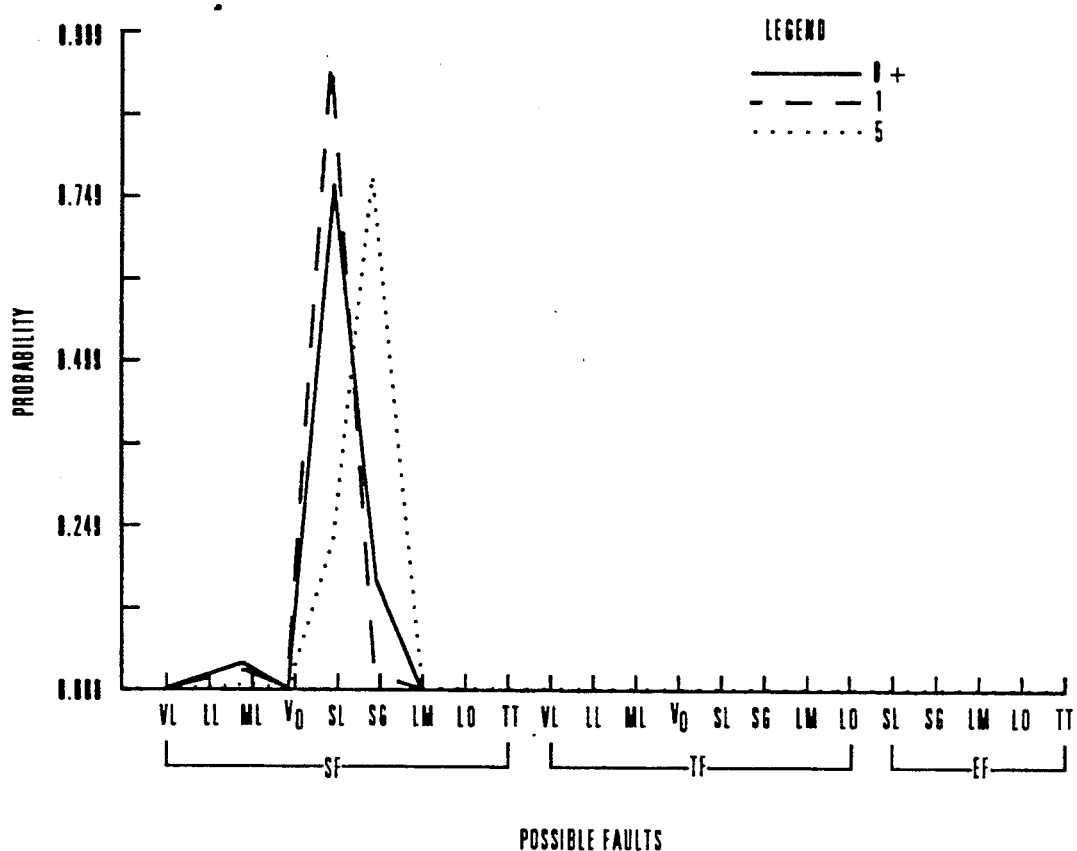

Suppose in the previous example that at 5 minutes we got a high reading for the steam generator radiation. This evidence would clearly point to a tube rupture, as shown in FIG. 12, and in tabular form, in Table 2.

Figure 13:
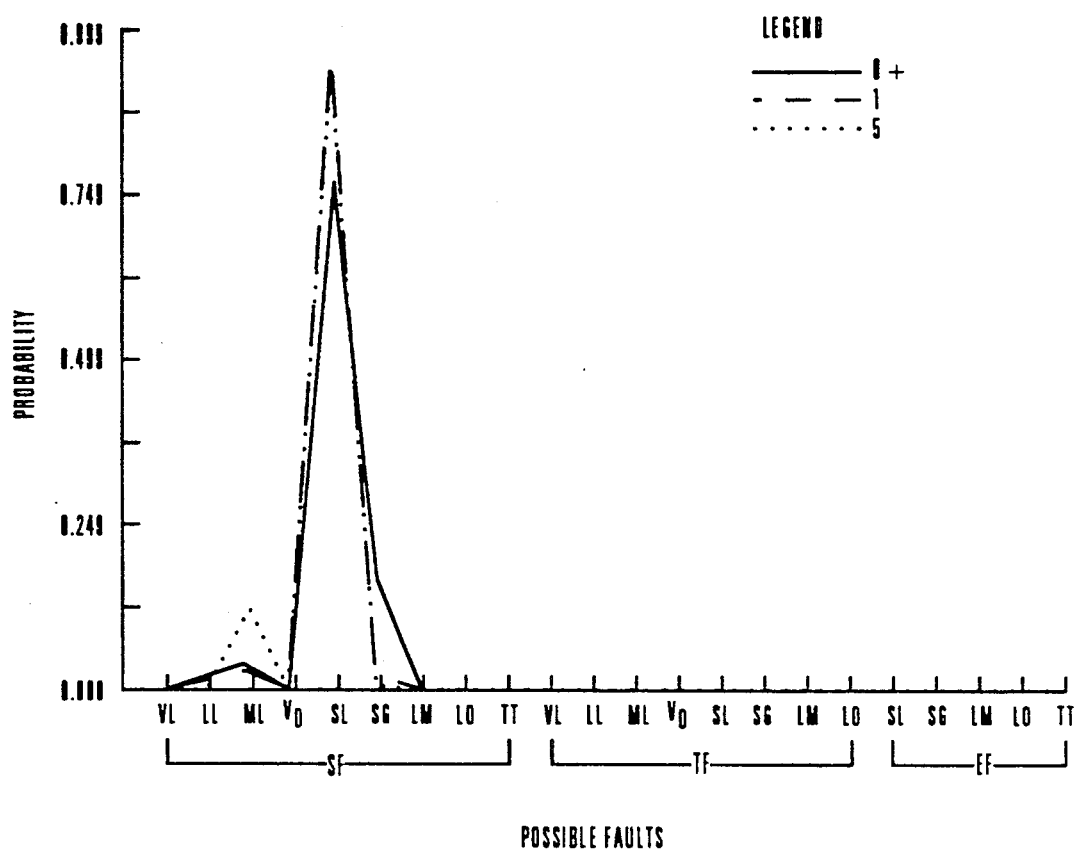
Figure 14:
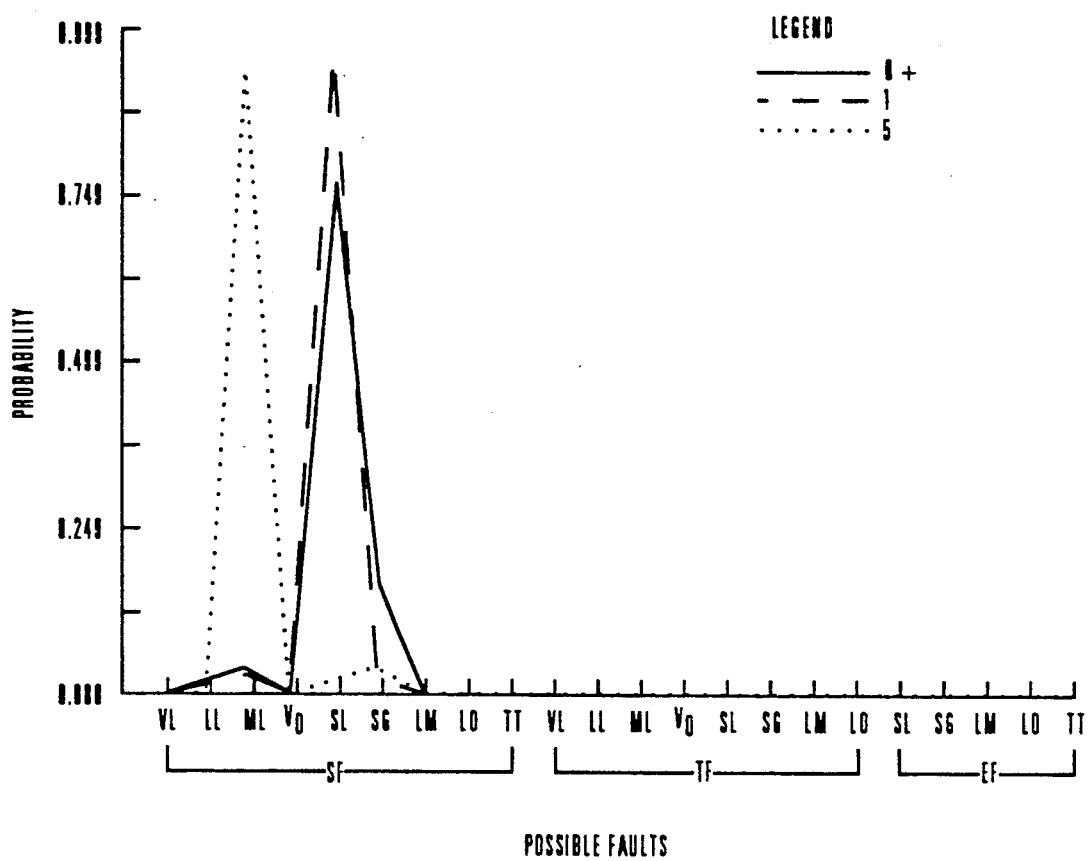

Conversely, if radiation were normal but humidity were high, this would further argue in favor of LOCAs, as opposed to tube rupture, and, in fact, begin to suggest that it might be a medium, rather than a small LOCA, as shown in FIG. 13 and Table 3. Indeed, if the humidity were not only high but, in fact, 100% fully saturated, this evidence would say that a medium LOCA is now much more probable than a small LOCA (see FIG. 14 and Table 4).

TABLE 2

| Diagnosis for Case 3A | | |
|---|---|---|
| Event Name | Short Name | Probability |
| Steam Generator Tube Rupture | SF-SG | 7.7744E-01 |
| Small LOCA | SF-SL | 2.1002E-01 |
| Large LOCAs | SF-L1 | 1.2360E-02 |
| Transients | SF-TR | 1.4016E-04 |
| V-Sequence | SF-$V_o$ | 3.2651E-05 |
| Emergency Feedwater Failure | EF | 4.8130E-06 |
| Turbine Trip Failure | TF | 8.5636E-07 |

TABLE 3

| Diagnosis for Case 3B | | |
|---|---|---|
| Event Name | Short Name | Probability |
| Small LOCA | SF-SL | 8.7429E-01 |
| Medium LOCA | SF-ML | 1.2570E-01 |

TABLE 3-continued

| Diagnosis for Case 3B | | |
|---|---|---|
| Event Name | Short Name | Probability |
| V-Sequence | SF-$V_o$ | 2.5360E-06 |
| Steam Generator Tube Rupture | SF-SG | 3.5139E-08 |
| Emergency Feedwater Failure | EF | 2.5980E-08 |
| Large LOCA | SF-LL | 2.2113E-08 |
| Turbine Trip Failure | TF | 9.8143E-09 |
| Transients | SF-TR | 2.5149E-09 |
| Very Large LOCA | SF-VLL | 2.2565E-12 |

TABLE 4

| Diagnosis for Case 3C | | |
|---|---|---|
| Event Name | Short Name | Probability |
| Medium LOCA | SF-ML | 9.4084E-01 |
| Small LOCAs | SF-L2 | 5.9161E-02 |
| Transients | SF-TR | 2.8170E-08 |
| Turbine Trip Failure | TF | 2.5706E-08 |
| Emergency Feedwater Failure | EF | 3.1090E-09 |
| Large LOCA | SF-LL | 8.5704E-10 |
| Very Large LOCA | SF-VLL | 1.3303E-12 |

What is claimed is:

1. An apparatus for determining the status of a system together with the probability of that status from time-dependent observables of the system, said apparatus comprising a computer, said computer including first memory means for storing a knowledge base, said knowledge base comprising data representative of a set of possible states of a system in association with probabilities that time-variable patterns of said observables will be present given the occurrence of such states, said apparatus including means for obtaining observables indicative of the operation of the system at a succession of different times and means for representing said observables in a time-succession of digitized codes, said apparatus also including diagnostic means responsive to data selected from said knowledge base and to said succession of digitized codes for generating a second set of digitized codes representing probability distributions over the set of said states and for updating said probability distributions as a function of time.

2. An apparatus as set forth in claim 1 including display means for presenting said probability distributions visually.

3. An apparatus as set forth in claim 1 wherein said knowledge base in said first memory means is organized into explicit, residual and impossible subsets and said memory means includes a first output means for applying to said diagnostic means digitized codes representative of said explicit, residual and impossible subsets.

4. An apparatus as set forth in claim 1 wherein said means for representing said time-succession of digitized codes comprises an A/D converter and a clock means, said clock means being operative to enable said A/D converter to generate time-dependent sequences of codes, said apparatus including second memory means for storing said time-dependent sequences of codes.

5. An apparatus as set forth in claim 4 wherein said second memory means includes a second output means for applying to said diagnostic means digitized codes representative of said time-dependent sequences of codes and said diagnostic module is responsive to outputs from said first and second memory means for generating options and associated probability distributions.

6. A method of diagnosing the instant state of a system having a state which varies with time using a computer having a memory, comprising the steps of storing in said memory a knowledge base comprising sets of digitized data representative of the possible states of said system in time-dependent form in association with the probabilities that certain observables will be present given the occurrence of the associated state, inputting into said computer evidence in a time-dependent form, and providing a probability distribution of the possible states of said system responsive to said data from said knowledge base and to said evidence in time-dependent form.

7. A method as set forth in claim 6 wherein said step of storing in said memory includes the step of discreting the data in said knowledge base in digital strings representing a range of values and a point in time in said string.

8. A method as set forth in claim 7 wherein said step of inputting into said computer includes the step of organizing said evidence into scenerio strings of digitized data.

9. A method as set forth in claim 8 wherein said step of providing a probability distribution includes the step of matching each of said scenerio strings with the digital strings in said knowledge base.

10. A method as set forth in claim 9 also including the step organizing the strings of digitized data in said knowledge base into categories, each one of said categories corresponding to a family of problem initiators.

* * * * *